United States Patent [19]

Davis et al.

[11] Patent Number: 4,480,066

[45] Date of Patent: Oct. 30, 1984

[54] RUBBER COMPOSITIONS AND ARTICLES THEREOF HAVING IMPROVED METAL ADHESION AND METAL ADHESION RETENTION

[75] Inventors: James A. Davis, Uniontown; Robert C. Koch, Akron, both of Ohio

[73] Assignee: The Firestone Tire & Rubber Company, Akron, Ohio

[21] Appl. No.: 524,496

[22] Filed: Aug. 18, 1983

[51] Int. Cl.$^3$ .......................... C08L 7/00; C08L 9/00; C08L 9/06; C08L 15/02

[52] U.S. Cl. .................................. 524/439; 525/440; 525/199; 525/236; 525/237

[58] Field of Search ................ 525/236, 199, 237, 232; 524/439, 440

[56] References Cited

U.S. PATENT DOCUMENTS

| | | | |
|---|---|---|---|
| 2,482,600 | 9/1949 | Sarbach | 18/45 |
| 2,581,920 | 1/1952 | Kuhn | 154/130 |
| 3,596,753 | 8/1971 | Knapp et al. | 198/193 |
| 3,645,934 | 2/1972 | Caywood | 260/5 |
| 3,928,259 | 12/1978 | Feniak | 525/236 |
| 4,220,512 | 9/1980 | Bohm et al. | 525/236 |
| 4,267,079 | 5/1981 | Davis et al. | 260/3.5 |
| 4,297,159 | 10/1981 | Dobias et al. | 524/439 |
| 4,320,173 | 3/1982 | Coran et al. | 524/439 |
| 4,323,485 | 4/1982 | Ahagon et al. | 525/236 |
| 4,376,838 | 3/1983 | Davis et al. | 524/184 |

*Primary Examiner*—Allan M. Lieberman
*Attorney, Agent, or Firm*—Daniel N. Hall

[57] ABSTRACT

Vulcanizable rubber compositions and articles such as tires having improved metal adhesion and metal adhesion retention to brass and brass-plated metallic reinforcement. The improvement comprises substituting at least about 10.0 parts by weight of a halogenated rubber for non-halogenated rubber present in the vulcanizable rubber composition. The non-halogenated rubber can be natural or synthetic or blends thereof. A method for improving the metal adhesion and metal adhesion retention between a vulcanizable rubber and brass or brass-plated metallic reinforcement includes the steps of blending at least about 10.0 parts by weight of a halogenated rubber with up to about 90.0 parts by weight of a vulcanizable rubber essentially free of other halogenated rubber and curing the blend of rubbers with the brass or brass-plated metallic reinforcement embedded therein.

5 Claims, No Drawings

RUBBER COMPOSITIONS AND ARTICLES THEREOF HAVING IMPROVED METAL ADHESION AND METAL ADHESION RETENTION

TECHNICAL FIELD

The present invention is directed toward improving the adhesion and adhesion retention between a rubber composition, used in the manufacture of tires, conveyor belts, hoses and the like, and metallic reinforcement cord, such as steel wire and cable which commonly carries a protective coating of zinc or brass, which is embedded in the stock. Flat sheets or strips of such stocks, reinforced with metal or fibers, are utilized as plies or other components of the articles and are referred to in the art as rubber skim stocks. Skim refers to a relatively thin layer or coating of the rubber over the reinforcement filaments or cords. Greater thicknesses of rubber are also bonded to metal in other instances such as motor mounts and these would not be termed skim stocks.

In the manufacture of the foregoing rubber articles, particularly steel-belted bias and radial tires, it has become common to reinforce the rubber skim stock material with steel wire or cable. One of the more important uses for a metallic reinforced rubber is as a belt where one or more of these belts are circumferentially oriented beneath the tread stock to maintain the integrity and shape of the tire during inflation and subsequent load. Other areas where metal reinforced rubber skim stock may be utilized are in the body ply, bead or chafer of the tire.

In order for these components to function effectively, it is imperative that adhesion between the rubber and the steel cord be effectively maintained. Because steel is prone to oxidation, which even in minor degree is highly deleterious to the necessary adhesion with the rubber skim stock, and it would be most impractical to incorporate a chemically clean, oxidation-free steel cord in the belt at the time of its manufacture, the steel cord is plated with zinc or brass thereby protecting it from oxidation until it can be used.

While adhesion between zinc or brass-plated steel cord and rubber is generally far greater than that between the latter and oxidized steel, existing data determined from articles life as well as modern testing techniques has indicated that adhesion obtained between plated steel cord and the elastomer must be increased for improved article life and service.

BACKGROUND ART

In order to promote adhesion between rubber and ferrous metals it is known to employ a variety of metallic salts as coatings to the metal or as an ingredient in a rubber composition. It is also known to add various resins as tackifiers and/or adhesion promoters and, in other instances, to employ both a metal salt and a resin. In still other instances it is known to add halogenated rubber to the rubber stock along with an organic complex of cobalt or nickel. Inasmuch as the present invention does not employ metallic salts, resins or organic complexes of cobalt or nickel, patents disclosed thereto are not relevant to the subject application apart from the fact that the components they teach improve the adhesion between rubber and metal.

With respect to the addition of halogenated rubber or polymers to vulcanizable rubber stocks, or the use of halogenated rubbers as adhesives, the general teaching in the art includes the following patents.

U.S. Pat. No. 2,482,600 discloses a heat resistant vulcanizable rubber and method for imparting heat resistance which is based upon the addition of unvulcanized polychloroprene with a copolymer of butadiene and acrylonitrile. Rubber-to-metal adhesion is neither taught nor suggested.

U.S. Pat. No. 2,581,920, owned by the Assignee of record herein, discloses an adhesive composition including a solvent, a dichlorobutadiene resin and chlorinated rubber for adhering natural as well as various synthetic rubbers to metallic substrates. The adhesive functions as a cement between the two materials and is not added to the natural or synthetic rubber but is rather used to coat one or both of the layers.

U.S. Pat. No. 3,596,753 discloses a rubber mixture comprising polychloroprene and nitrile rubber which is reinforced with metallic wire such as zinc-coated steel. The patent teaches that the rubber composition is heat resistant and is, therefore, useful for heat resistant conveyor belts. In order to promote rubber-to-metal adhesion, inorganic cobalt complexes are disclosed.

U.S. Pat. No. 3,645,934 discloses a process whereby natural rubber, polychloroprene and an EPDM rubber are compounded with carbon black to prepare vulcanizable, ozone resistant compositions. Again, while halogenated rubbers are combined with natural rubber, improved metal adhesion is not suggested.

Lastly, two recent U.S. patents of ours, owned by the Assignee of record herein, Nos. 4,267,079 and 4,376,838 actually disclose the use of certain halogenated rubbers, e.g., neoprene and chlorobutyl, with natural rubber in conjunction with an organic complex of cobalt or nickel or salt of cobalt or nickel with an aliphatic fatty acid in order to improve adhesion between the rubber and metallic reinforcement embedded therein.

We have also found that improved rubber-to-metal adhesion is obtained by the use of the halogenated rubber alone without any cobalt, nickel or other transition metal complexes or salts that are usually added for the sole purpose of improving rubber-to-metal adhesion, thereby effecting a savings by the elimination of these compounds which are generally costly.

DISCLOSURE OF INVENTION

The present invention provides a vulcanizable rubber composition, essentially free of transition metal adhesion promoting additives, of improved metal adhesion and metal adhesion retention properties with brass and brass-plated metallic reinforcing elements. The improvement comprises at least about 10.0 parts by weight of a halogenated rubber for the rubber present in the vulcanizable composition so as to provide 100 parts of rubber.

The present invention further provides a metal-reinforced rubber ply to be used as a component in the construction of a manufactured rubber article such as a tire, the ply having a rubber composition, essentially free of transition metal adhesion promoting additives, and a brass-plated element bonded thereto. The rubber composition is made by curing a composition comprising at least 10.0 parts by weight of a halogenated rubber and up to about 90.0 parts by weight of a vulcanizable rubber essentially free of other halogenated rubber.

In the manufacture of rubber articles such as tires, several structural components are employed. Some of the structural rubber components found in a typical tire, often as one or more layers, include a tread ply skim, body ply skim, bead filler, innerliner, sidewall, stabilizer ply insert, toe filler, chafer, undertread, tread, and the like. Many of these rubber ply components can be reinforced with steel wire or cable and it is important that the bond between the rubber and the reinforcing filaments be strong.

Still further, the present invention provides a method of improving metal adhesion and metal adhesion retention properties between a vulcanizable rubber composition, essentially free of transition metal adhesion promoting additives, and brass or brass-plated metallic reinforcing elements. The method comprises the steps of blending at least about 10.0 parts by weight of a halogenated rubber with up to about 90.0 parts by weight of a vulcanizable rubber, essentially free of other halogenated rubber, and curing the blend of rubbers with the brass or brass-plated metallic reinforcing elements embedded therein.

PREFERRED MODE FOR CARRYING OUT THE INVENTION

To illustrate our invention, a typical example of a rubber composition with brass-plated metallic reinforcement embedded therein was chosen. In particular, the example used to demonstrate the invention was a rubber skim stock which is suitable for the preparation of rubber articles such as tires. Adhesion between this stock with brass-plated steel reinforcement subsequent to vulcanization was measured and has also been presented hereinbelow.

The improved vulcanizable rubber composition of our invention exhibited better adhesion, improved rubber coverage retention and better metal adhesion retention with brass as well as metallic reinforcement such as steel, plated with brass, and comprises a vulcanizable rubber stock having from about 10.0 to about 25.0 parts of a halogenated rubber, with about 15.0 to 20.0 parts thereof being preferred. The amount of halogenated rubber added is by weight and replaces an equivalent amount of the vulcanizable rubber, e.g., natural rubber, the total amounts of natural rubber and halogenated rubber in the rubber stock being equal to 100. The improved rubber stock has been found to have better adhesion with metallic reinforcement embedded therein than comparable stocks which do not have halogenated rubbers, particularly when both are subjected to oven aged, oxygen aged, long term natural aged and long term humidity chamber aged testing, the latter at 90% relative humidity and 35° C.

As stated hereinabove, practice of the present invention requires the addition of at least one halogenated rubber, such as chlorinated or brominated butyl, commonly known as chlorobutyl or bromobutyl, respectively, to the otherwise conventional natural rubber skim stock. Chlorobutyl rubber used in the following examples had from 1.1 to 1.3% chlorine by weight, 1.1 to 2.0 mol. % unsaturation, a specific gravity of 0.92 at 25° C. and Mooney Viscosity ML 1+8 at 100° C. of 41 to 59. Exxon Chemical Americas currently provide three grades of chlorobutyl designated as Grades 1065 (ML 1+8 at 100° C. 41 to 51); 1066 (ML 1+8 at 100° C. 52 to 59) and 1068 (ML 1+8 at 125° C. 45 to 52). The preferred bromobutyl rubber for incorporation into the rubber skim stock is Polysar's Bromobutyl X-2, a stable brominated butyl rubber having about 2.0% bromine by weight, and a specific gravity of 0.93 at 25° C. Exxon offers a similar brominated butyl rubber having a Mooney Viscosity ML 1+8 at 125° C. of 42 to 52.

Other halogenated rubbers, i.e., fluorocarbon elastomers such as DuPont's Viton A having a specific gravity of about 1.86 or DuPont's Hypalon 30, a chlorosulfonated polyethylene polymer which contains about 43 percent chlorine by weight, 1.0 to 1.1% sulfur by weight, and having a specific gravity of about 1.26 at 25° C. can be used by one skilled in the art to practice the present invention. A blend of halogenated rubbers can also be used.

Addition of the halogenated rubber is directly to the natural rubber and several other rubber chemical ingredients, i.e., carbon black, mineral fillers, zinc oxide, stearic acid, process oil, etc., to form a Banbury mixed rubber masterbatch. The remaining conventional compounding ingredients including curatives (sulfur and accelerators), cure retarder and the like are subsequently added to the rubber masterbatch by mill mixing.

The remaining polymer portion of the vulcanizable rubber composition is not deemed to be a limitation to the practice of the instant invention. Natural rubber may also be employed alone or in a blended state with one or more synthetic rubbers such as styrene-butadiene, synthetic isoprene or other synthetic rubbers with a natural rubber content of at least 40 to 50 percent. Further, pure forms of synthetic rubbers such as those disclosed may be used either alone or blended with other synthetic rubbers. Irrespective of the polymer(s) employed, practice of the present invention requires only that a given amount be substituted by an equivalent weight of a halogenated rubber.

In order to determine the improvement in adhesion and adhesion retention obtained when a halogenated polymer is added to a rubber composition, T-adhesion tests (rubber-to-steel cord) were conducted according to the procedure which follows.

The test utilized T-adhesion pads prepared by placing 60 gauge sheets of uncured fully compounded rubber skim stock on 51 gauge fabric reinforced rubber backing. Commercial brass-coated wires (1×5×0.25 mm diam.) were placed between two pads of the reinforced rubber skim stock with the wires in contact with the uncured rubber skim at 1.25 cm intervals. The width of each adhesion pad was 1.25 cm. The pads were placed in a preheated curing mold and were cured for 30 minutes at 149° C. Rubber-steel cord adhesion testing was done on a Model 1130 Instron Universal Tester at a crosshead speed of 25.4 cm per minute and 110° C.

The T-adhesion pads were preheated in the 110° C. oven for 20 minutes prior to testing. Oven aging of the cured T-adhesion pads was done in a forced air oven at 121° C. for two days. Oxygen bomb aging of the cured T-adhesion pads was done in a pressure tight bomb at 2.07 MPa pressure for 24 and 48 hours at 70° C. in a 100 percent oxygen atmosphere. Long term humidity chamber aging of the cured T-adhesion pads was done at 90 percent relative humidity at 35° C. Long term natural aging of the cured T-adhesion pads was done at room temperature.

DETAILED T-ADHESION TEST PROCEDURE

1. Using a Clicker machine and a 15.24×1.25 cm die, prepare an adequate number of calendered and control stock samples for T-adhesion pad building.
2. Use one piece of calendered fabric reinforced rubber backing (0.1295 cm).

3. Ply one piece of 60 gauge control rubber skim stock (0.1524 cm) onto the fabric backing.
4. Place sample in building jig with fabric side down.
5. Place ten cords (of brass coated wire) approximately 17.78 cm in length equally spaced on top of the two piece assembly.
6. Invert another 2 ply assembly, made as in items 1, 2 and 3, on top of cords so that cords are between the 2 layers of rubber skim stock to be tested.
7. This assembly should now fit snugly into the cavity of the curing mold.
8. Adhesion pads shall be cured for 30 minutes at 149° C. and then allowed to equilibrate for 24 hours before testing.
9. Testing Machine: Model 1130 Instron Universal Tester.
10. Test speed 25.4 cm/minute; testing temperature, 110° C. after 20 minutes preheat.
11. The top grip shall be of a special holder made for the cured sample, with a slot in the bottom to permit the sample to be inserted with the wires protruding. The bottom grip should be a wedge type, designed to exert increasing tightening as each wire is pulled from the cured sample.
12. Record 10 wire pull-outs and average. Multiply average pull-out force value by 0.3572 to obtain kilograms per centimeter.

In the tests which follow, a rubber skim stock, composition A, was prepared as a control which did not contain any halogenated rubber. Rubber compositions B and C were prepared exactly as was composition A except that they contained 15.0 and 20.0 parts by weight of chlorobutyl rubber, respectively. Formulations for each were otherwise as follows with all parts given on the basis of parts per hundred parts of rubber (phr).

| Compounding Ingredients | Composition A |
|---|---|
| Natural Rubber (E grade) | 100 |
| HAF Black | 60 |
| Zinc Oxide | 7.5 |
| Stearic Acid | 0.50 |
| Hydrocarbon resins | 2.0 |
| Santoflex DD[1] | 2.0 |
| Shell Dutrex 726[2] | 2.0 |
| NOBS Special accelerator[3] | 0.80 |
| Santoflex 13[4] | 1.0 |
| Sulfur MB[5] | 7.50 |
| Santogard PVI[6] | 0.40 |

[1] 6-dodecyl-1,2-dihydro-2,2,4-trimethylquinoline
[2] a known process oil of medium solvency containing a 35% minimum of naphthene ring carbons
[3] N—oxydiethylene benzothiazole-2-sulfenamide (NOBS Special accelerator)
[4] N—(1,3-dimethylbutyl)-N'—phenyl-p-phenylene-diamine
[5] 80/20 sulfur/extender oil preblend, with a naphthenic oil in the range of 18-22% oil. The sulfur is a yellow powder, 89.5 min. of which is insoluble sulfur.
[6] N—(cyclohexylthio)phthalimide It is to be understood that the foregoing composition of the rubber skim stock has been presented solely to enable those skilled in the art to have at least one rubber skim stock with which to practice the invention. As such, the present invention is not to be limited only to this specific formulation.

Six sets of tests were conducted on each of the three stocks for comparison. Table I shows the results of the testing under normal, oven aged and under 24 and 48 hours oxygen aged conditions. Long term humidity chamber aging and long term natural aging tests are reported in Tables II and III, respectively. The force necessary to pull or remove the metallic reinforcement from the vulcanized rubber skim stock is given first, in kg/cm, followed by the percent of rubber skim stock remaining on the surface of the metallic reinforcement. The amount of rubber skim stock remaining on the metallic reinforcement was determined by visual examination and has been reported as % rubber coverage. Brass plated steel metallic reinforcement was utilized in all of the tests.

Normal or unaged testing, Test A, is merely a measurement of the initial adhesive properties between the rubber composition and the metallic reinforcement. The oven aging test, Test B, is an accelerated heat aging test and is significant in determining the effect of heat on the thermal stability of the chemical bonds formed between the rubber composition and the metallic reinforcement during vulcanization. The effect of oxygen exposure to the rubber-metal bond is presented for periods of 24 and 48 hours exposure in 100% oxygen atmosphere at 70° C. as Tests C and D. Oxygen, which commonly functions as an oxidizing agent, has long been known by those skilled in the art to have deleterious effects on the chemical nature of the rubber to metal bonds whether they be zinc-sulfur or copper-sulfur bridges. The significance of oxygen bond aging tests is to determine the chemical stability of chemical bonds formed between the rubber skim stock and the metallic reinforcement when exposed to conditions of high oxygen atmosphere and high temperature, as compared to ambient, and extended periods of time.

TABLE I

| Short Term Aged Wire Adhesion Tests | | | |
|---|---|---|---|
| Rubber Composition | A | B | C |
| Natural rubber, wt % | 100 | 85.0 | 80.0 |
| Chlorobutyl rubber, wt % | — | 15.0 | 20.0 |
| Test A | | | |
| Normal (Unaged)[a] | | | |
| Brass-plated cord | | | |
| Kg/cm | 29.79 | 29.75 | 25.33 |
| % rubber coverage | 70-75 | 80-85 | 90-95 |
| Test B | | | |
| Oven Aged[b] | | | |
| Brass-plated cord | | | |
| Kg/cm | 15.64 | 16.65 | 18.27 |
| % rubber coverage | 90 | 90-95 | 90-95 |
| Test C | | | |
| 24 Hours Oxygen Bomb Aged[c] | | | |
| Brass-plated cord | | | |
| Kg/cm | 16.72 | 20.47 | 17.97 |
| % rubber coverage | 15-20 | 75 | 85-90 |
| Test D | | | |
| 48 Hours Oxygen Bomb Aged[d] | | | |
| Brass-plated cord | | | |
| Kg/cm | 17.36 | 18.90 | 18.97 |
| % rubber coverage | 35 | 55-60 | 80-85 |

[a] T-adhesion pads cured 30 minutes at 149° C. and tested at 110° C.
[b] T-adhesion pads cured 30 minutes at 149° C., heat aged in forced air oven for 2 days at 121° C. and tested at 110° C.
[c] T-adhesion pads cured 30 minutes at 149° C., aged in a pressure tight bomb for 24 hours at 70° C. in a 100% oxygen atmosphere and tested at 110° C.
[d] T-adhesion pads cured 30 minutes at 149° C., aged in a pressure tight bomb for 48 hours at 70° C. in a 100% oxygen atmosphere and tested at 110° C.

As can be determined from Table I, adhesion of compositions B and C to brass-plated steel cord was improved over composition A in the oven aged and oxygen bomb aged tests. Rubber composition A, which contained no chlorobutyl rubber, showed lower rubber coverage values in all four tests and particularly poor results for the oxygen bomb aging.

The rubber coverage measurement is deemed to be significant in that it visually represents the increased adhesion of the rubber composition to the plated steel cord. As is well known to those skilled in the art, the amount of rubber left adhering to the steel cord after it has been pulled from a cured T-adhesion pad represents the relationship of the adhesive force attaching the rubber composition to the surface of the steel cord and the tear strength of the rubber composition itself. Large percentages of rubber coverage indicate that the adhesion to the steel cord exceeds the internal strength of the rubber composition itself, i.e., tear strength. Therefore, when the rubber coverage is very high it can be concluded that the metal to rubber adhesion is greater than the force measured to pull the steel cord out of the rubber pad since the force measured was a result of the rubber composition rupturing and not the chemical bonds present at the metal to rubber interface.

TABLE II

| Long Term Humidity Chamber Aged Tests | | | |
|---|---|---|---|
| Rubber Composition | A | B | C |
| Natural rubber, wt % | 100 | 85 | 80 |
| Chlorobutyl rubber, wt % | — | 15 | 20 |
| Test E | | | |
| 0 Day | | | |
| Brass-plated cord | | | |
| Kg/cm | 26.93 | 25.93 | 26.40 |
| % rubber coverage | 85 | 95–100 | 90 |
| Test F | | | |
| 30 Days | | | |
| Brass-plated cord | | | |
| Kg/cm | 26.61 | 25.43 | 24.45 |
| % rubber coverage | 85–90 | 95 | 90–95 |
| Test G | | | |
| 60 Days | | | |
| Brass-plated cord | | | |
| Kg/cm | 22.86 | 25.18 | 23.57 |
| % rubber coverage | 50 | 85 | 85 |
| Test H | | | |
| 90 Days | | | |
| Brass-plated cord | | | |
| Kg/cm | 24.54 | 24.86 | 21.65 |
| % rubber coverage | 60 | 90–95 | 85–90 |
| Test I | | | |
| 120 Days | | | |
| Brass-plated cord | | | |
| Kg/cm | 20.07 | 23.86 | 21.22 |
| % rubber coverage | 60–65 | 90 | 85 |
| Test J | | | |
| 150 Days | | | |
| Brass-plated cord | | | |
| Kg/cm | 17.61 | 19.75 | 20.07 |
| % rubber coverage | 35 | 80–85 | 75 |
| Test K | | | |
| 180 Days | | | |
| Brass-plated cord | | | |
| Kg/cm | 17.15 | 22.5 | 23.15 |
| % rubber coverage | 20 | 80 | 70–75 |
| Test L | | | |
| 210 Days | | | |
| Brass-plated cord | | | |
| Kg/cm | 17.82 | 20.97 | 21.61 |
| % rubber coverage | 20–25 | 80 | 75–80 |

TABLE III

| Long Term Natural Aging Tests | | | |
|---|---|---|---|
| Rubber Composition | A | B | C |
| Natural rubber, wt % | 100 | 85 | 80 |
| Chlorobutyl rubber, wt % | — | 15 | 20 |
| Test E | | | |
| 0 Day | | | |
| Brass-plated cord | | | |
| Kg/cm | 26.93 | 25.93 | 26.40 |
| % rubber coverage | 85 | 95–100 | 90 |
| Test M | | | |
| 3 Months | | | |
| Brass-plated cord | | | |
| Kg/cm | 24.61 | 23.15 | 26.00 |
| % rubber coverage | 90 | 95 | 95–100 |
| Test N | | | |
| 6 Months | | | |
| Brass-plated cord | | | |
| Kg/cm | 25.04 | 24.18 | 28.43 |
| % rubber coverage | 90 | 95 | 95–100 |
| Test O | | | |
| 9 Months | | | |
| Brass-plated cord | | | |
| Kg/cm | 25.90 | 26.08 | 29.11 |
| % rubber coverage | 85 | 90 | 90–95 |
| Test P | | | |
| 12 Months | | | |
| Brass-plated cord | | | |
| Kg/cm | 24.93 | 24.07 | 29.04 |
| % rubber coverage | 80–85 | 90–95 | 90–95 |
| Test Q | | | |
| 15 Months | | | |
| Brass-plated cord | | | |
| Kg/cm | 22.11 | 23.92 | 26.43 |
| % rubber coverage | 75–80 | 85–90 | 90–95 |
| Test R | | | |
| 18 Months | | | |
| Brass-plated cord | | | |
| Kg/cm | 22.15 | 23.93 | 25.72 |
| % rubber coverage | 70–75 | 85 | 85–90 |
| Test S | | | |
| 24 Months | | | |
| Brass-plated cord | | | |
| Kg/cm | 22.54 | 21.82 | 23.58 |
| % rubber coverage | 75–80 | 90 | 90 |

In Table II, the control, composition A, provided comparable adhesion values to compositions B and C up to about 90 days, although rubber coverage for the control began to diminish at about 60 days. Beyond 90 days compositions B and C provided much improved adhesion values and again, a greater percentage of rubber coverage. Similar results were observed for long term natural aging in Table III, with compositions B and C again showing an improvement after about 90 days.

Based on the foregoing results reported in Tables I to III, we consider the presence of a minor amount of halogenated rubber in a rubber skim stock to be effective in promoting adhesion between the rubber skim stock and brass or brass-plated metallic reinforcement without the separate addition of transition metal additives employed solely for the purpose of improving rubber-to-metal adhesion particularly as seen in long term humidity and long term natural aging tests. As stated hereinabove, the rubber can be natural or synthetic or a blend and formulated as a rubber stock or a skim stock. Also, the wire coating in the practice of our invention can be in the form of a strand, mat, web, ply or braid.

The present invention also finds utility in, for example, brassed metal-rubber articles such as motor mounts, cutless bearings, torsilastic springs, power belts, printing rolls, metal wire reinforced or braided hose, electrical deicers, shoe heels and wherever it is desired to secure rubber to metal or provide a flexible and strong, thermally stable bond between the same.

In conclusion, it is to be understood that all methods and rubber compounds disclosed herein fall within the scope of the claimed invention and that the subject invention is not to be limited by the examples set forth herein. As will be apparent to those skilled in the art, the formulation of the rubber composition can be varied within the scope of our total specification disclosure by selection of various halogenated rubbers as well as the amounts thereof, and it is believed that practice of the present invention can be determined without departing from the spirit of the invention herein disclosed and described, the scope of the invention being limited solely by the scope of the attached claims.

We claim:

1. A brass or brass-plated metallic reinforced vulcanizable rubber composition suitable for rubber plies essentially free of transition metal adhesion promoting additives having improved metal adhesion and metal adhesion retention properties with brass and brass-plated reinforcing elements, wherein the improvement comprises:

substituting at least about 10.0 parts by weight of a halogenated rubber for the rubber present in said vulcanizable composition so as to provide 100 parts of rubber;

wherein said halogenated rubber is selected from the group consisting of fluorocarbon elastomers and chlorosulfonated polyethylene; and, wherein said rubber in said vulcanizable rubber composition is selected from the group consisting of natural rubber, synthetic rubber and rubber blends thereof and wherein said vulcanizable rubber composition contains at least 40 to 50 percent of natural rubber.

2. A metal-reinforced rubber ply to be used as an element in a manufactured rubber article, said ply having a rubber composition essentially free of transition metal adhesion promoting additives and a brass-plated element bonded thereto wherein said rubber composition is made by curing a composition comprising:

at least about 10.0 parts by weight of a halogenated rubber; and up to about 90.0 parts by weight of a vulcanizable rubber essentially free of other halogenated rubber;

wherein said halogenated rubber is selected from the group consisting of fluorocarbon elastomers and chlorosulfonated polyethylene; and, wherein said rubber in said vulcanizable rubber composition is selected from the group consisting of natural rubber, synthetic rubber and rubber blends thereof and wherein said vulcanizable rubber composition contains at least 40 to 50 percent of natural rubber.

3. A method for improving metal adhesion and metal adhesion retention properties between a vulcanizable rubber composition, essentially free of transition metal adhesion promoting additives, and brass or brass-plated metallic reinforcing elements comprising the steps of:

blending at least about 10.0 parts by weight of a halogenated rubber with up to about 90.0 parts by weight of a vulcanizable rubber essentially free of other halogenated rubber; and curing said blend of rubbers with said brass or brass-plated metallic reinforcing elements embedded in said rubber composition;

wherein said halogenated rubber is selected from the group consisting of bromobutyl rubber, chlorobutyl rubber, fluorocarbon elastomer and chlorosulfonated polyethylene; and, wherein said rubber in said vulcanizable rubber composition is selected from the group consisting of natural rubber, synthetic rubber and blends thereof and wherein said vulcanizable rubber composition contains at least 40 to 50 percent of natural rubber.

4. A method, as set forth in claim 3, wherein said rubber is natural rubber and said halogenated rubber is chlorobutyl rubber.

5. A method as set forth in claim 4, comprising from about 15.0 to 20.0 parts by weight of chlorobutyl rubber.

* * * * *